United States Patent [19]
Tamai et al.

[11] 4,247,037
[45] Jan. 27, 1981

[54] METHOD FOR WELDING TUBULAR MEMBERS OF STAINLESS STEEL

[75] Inventors: Yasumasa Tamai, Hitachi; Teruo Matsumoto, Ibaraki, both of Japan

[73] Assignee: Hitachi, Ltd., Japan

[21] Appl. No.: 56,238

[22] Filed: Jul. 10, 1979

[30] Foreign Application Priority Data

Jul. 11, 1978 [JP] Japan .................. 53-84299

[51] Int. Cl.³ ............................... B23K 31/02
[52] U.S. Cl. ............................... 228/203; 148/127; 228/239
[58] Field of Search .............. 228/239, 238, 141.1, 228/164, 203; 148/127

[56] References Cited

U.S. PATENT DOCUMENTS

| | | | |
|---|---|---|---|
| 2,249,723 | 7/1941 | Orr, Jr. | 228/238 X |
| 2,588,700 | 3/1952 | Carpenter | 228/238 X |
| 2,834,097 | 5/1958 | Eickenberg et al. | 228/238 X |

Primary Examiner—Richard B. Lazarus
Attorney, Agent, or Firm—Craig and Antonelli

[57] ABSTRACT

In welding tubular members of stainless steel, metal is deposited by build-up welding on a portion of the inner surface of each tubular member adjacent an edge thereof where welding gives a heat affection and exposed to a corrosive fluid when in service, and melting a portion of the inner surface of each tubular member in a zone adjacent to the metal deposited by build-up welding and affected by the heat of the build-up welding, said portion being exposed to the corrosive fluid when in service. Following the completion of these two steps, the tubular members of stainless steel are welded at the edges thereof to be joined. The method has the effect of preventing the occurrence of stress corrosion cracking at the inner surface of the piping which is near the joint and exposed to the corrosive fluid.

3 Claims, 19 Drawing Figures

17  (×400)

17  (×400)

17  ↑ (×400)
    M (×400)

16  (×400)

(×400)

METHOD FOR WELDING TUBULAR MEMBERS OF STAINLESS STEEL

BACKGROUND OF THE INVENTION

This invention relates to a method for welding stainless steel, and more particularly it is concerned with a welding method, suitable for use in places where no recourse can be had to solution heat treatment for preventing stress corrosion cracking, for joining tubular members of low carbon stainless steel of high corrosion resistance adapted to handle a fluid of high temperature and high pressure, without causing stress corrosion cracking in the welding heat affected zone of the piping produced.

There have in recent years been occurrences of stress corrosion cracking in the grain boundary of the welding heat affected zone of piping of SUS304 for the primary system of nuclear power plants of the boiling-water reactor type. Such stress corrosion cracking is produced, as shown in FIG. 1, in a portion 4 of material in which a high tensile stress 1 exceeding 0.2% proof stress, a presence of chromium-depleted-zone 2 (sensitization of the material) produced along the grain boundary in the welding heat affected zone and a corrosion environment 3 including the presence of dissolved oxygen act simultaneously. In a welding process heretofore used for joining tubular members of SUS304 wherein natural cooling is effected without performing forced cooling as by passing cooling water through the inside of the tubular members, shrinkage of the material occurs as a result of a butt weld 6 as shown in FIG. 2(a). This induces high tensile stress [represented by a line A in FIG. 2(b)] as high as several tens of kg/cm² on the inner surfaces of the tubular members 5A and 5B of SUS304. In FIG. 2(b), the TS side is a tensile stress zone, and the CS side is a compressive stress zone, and a line B indicates a 0.2% proof stress level. The chromium-depleted-zone 2 is produced in a welding heat affected zone 7 of the tubular members 5A and 5B. When a corrosive fluid flows through the inside of the tubular members 5A and 5B in which the high tensile stress 1 and chromium-depleted-zone 2 have been produced, there is a high risk of occurrence of stress corrosion cracking in the welding heat affected zone 7 of the tubular members 5A and 5B.

SUMMARY OF THE INVENTION

This invention provides a solution to the problem of the prior art described hereinabove. Accordingly, the object of this invention is to provide a welding method for joining tubular members of stainless steel capable of reducing the possibilities of occurrence of stress corrosion cracking when repair work is done in the existing piping of a plant.

The outstanding characteristics of the present invention include the features of depositing metal by build-up welding on the inner surface of each of a plurality of tubular members of stainless steel to be joined by welding, such surface being located in the vicinity of a joint to be produced by welding and adapted to be brought into contact with a corrosive fluid when in service, and melting the inner surface of each of the tubular members in a zone affected by the heat of build-up welding and disposed adjacent the metal deposited by the build-up welding. Following completion of the aforesaid steps, the tubular members are welded at the joint to provide a unitary structure.

DESCRIPTION OF THE PREFERRED EMBODIMENT

Figure 1:
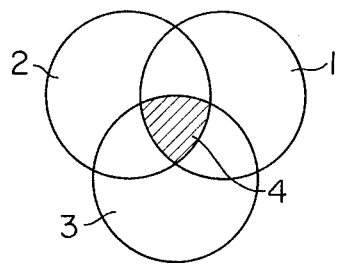
FIG. 1 is a view in explanation of the factors concerned in the occurrence of stress corrosion cracking.
Figure 2A:
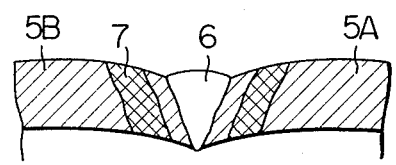
FIGS. 2a and 2b are views in explanation of residual stress produced in a conventional welding joint relying on natural cooling.
Figure 2B:
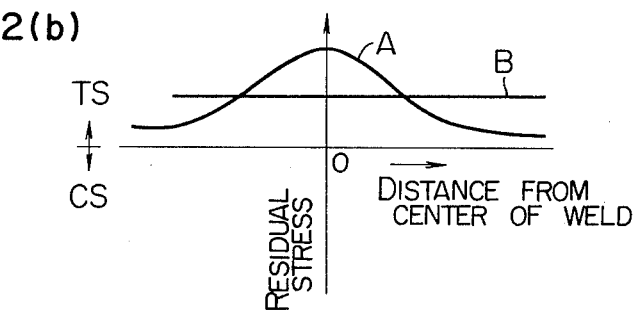

Prior to describing in detail the present invention, studies of the problem encountered and various proposals that have hitherto been made to solve the problem will first be described. Known in the art is a welding method shown in FIG. 3 for joining two tubular members intended to prevent the occurrence of stress corrosion cracking, which combines build-up welding for depositing metal on the inner surface of each tubular member with solution heat treatment. In this method, a sensitized zone on the inner surface of the welded piping in the welding heat affected zone 7 shown in FIG. 2(a) is welded by using low carbon austenitic stainless stell, inconel or other corrosion resisting material. This method will be described by referring to FIGS. 3 and 4.

Figure 3A:
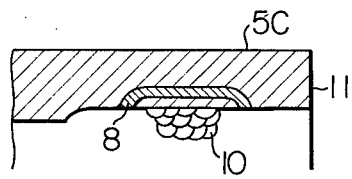
FIG. 3 shows the steps followed in depositing metal by build-up welding on the inner surface of a tubular member by a process of the prior art, FIG. 3(A) showing metal deposited by build-up welding on a portion of the inner surface of the tubular member, FIG. 3(B) showing metal deposited on the inner surface of the tubular member by build-up welding after the metal deposited as shown in FIG. 3(A) has been subjected to solution heat treatment, and FIG. 3(C) showing edge preparation done on the edge of the tubular member to be welded following depositing of metal by build-up welding on the inner surface of the tubular member.
Figure 3B:
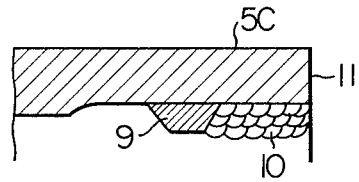

Low carbon austenitic stainless stell containing delta ferrite in several percent was deposited by build-up welding on the inner surface of a tubular member (SUS304) 5C as shown at 10 in a position near an edge 11 to be welded. The build-up welding for depositing the metal 10 on the inner surface of the tubular member produces a sensitized zone 8 in the member 5C as shown in FIG. 3(A). However, solution heat treatment to which the tubular member 5C is subjected following the build-up welding causes the sensitized zone to disappear, and the deposited metal 10 produced by build-up welding is converted into a deposited metal 9 produced by solution heat treatment. After the deposited metal 9 is partly worked, metal is deposited again by build-up welding as shown at 10 in FIG. 3(B) in a position extending from the deposited metal 9 to the edge 11. Following completion of metal deposition on the inner surface of the tubular member 5C by build-up welding, edge preparation is done as shown at 12 at the edge 11 to be welded. The edge 11 of the tubular member 5C is located in juxtaposed relation to a corresponding edge of another tubular member 5D subjected to build-up welding performed by following the same steps as described hereinabove and having edge preparation done in the same manner as described hereinabove, and the two tubular members 5C and 5D are welded as shown in FIG. 4.

Figure 4:
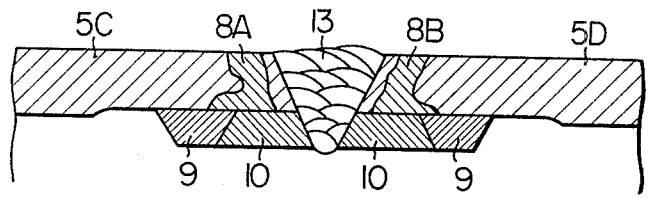
FIG. 4 is a view showing a plurality of tubular members welded together after depositing of metal by build-up welding has been completed accoridng to the steps shown in FIG. 3.

In FIG. 4, 13 designates a weld. Though the sensitized zones 8A and 8B are formed in the vicinity of the weld 13, there is no sensitized zone on the inner surfaces of the tubular members 5C and 5D, the deposited metal 9 formed by solution heat treatment and the deposited metal 10 formed by build-up welding which are brought into contact with corrosive fluid when in service. Therefore, it will be apparent that the piping produced by performing the welding method described above is free from stress corrosion cracking.

Depositing of metal on the inner surface of piping by build-up welding is believed to have effect in preventing the occurrence of stress corrosion cracking thanks to the low carbon content of the metal deposited by build-up welding and the precipitation of delta ferrite (about 10% of delta ferrite is precipitated by build-up welding alone) that markedly increases the resistance of the metal to the occurrence of stress corrosion cracking. The sensitized zones 8A and 8B produced by forming a welded joint are completely masked as shown in FIG. 4, thereby enabling stress corrosion cracking to be prevented.

Figure 5:
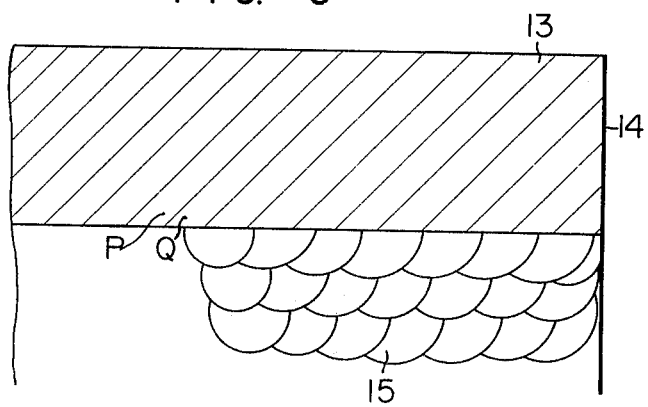
FIG. 5 is a view showing the inner surface of existing piping of a nuclear power plant on which build-up welding alone has been performed.

In a nuclear power plant, there arises the need to cut off a defective portion of the existing piping 13 to be replaced by a new tubular member as shown in FIG. 5 and to weld a fresh tubular member to the piping 13. When this is the case, it is possible to deposit low carbon austenitic stainless steel as shown at 15 on the inner surface of the piping 13 in the vicinity of an edge 14 of the piping 13 where welding is to be effected. However, it would be impossible to subject the piping 13 in situ to solution heat treatment. With the build-up welding alone performed, the sensitized zone 8 shown in FIG. 3(A) would be formed in the vicinity of the deposited metal 15 produced by build-up welding.

Figure 6A:
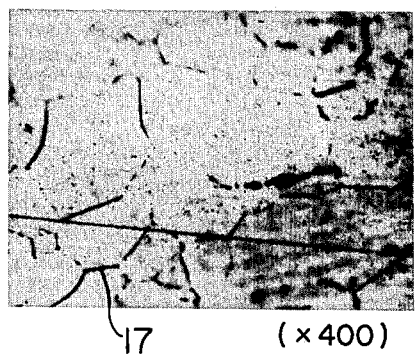
FIG. 6 shows the microstructures of the material of the piping shown in FIG. 5 after build-up welding has been performed, FIG. 6(A) showing the microstructure at point P in FIG. 5 and FIG. 6(B) showing the microstructure at point Q in FIG. 5.
Figure 6B:
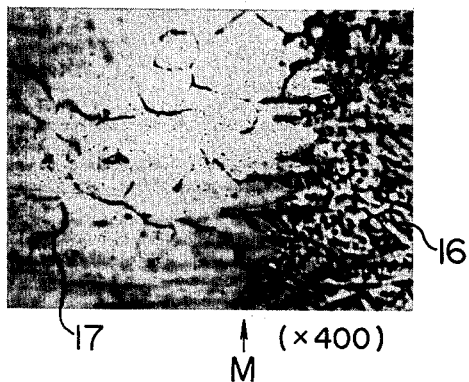

FIGS. 6(A) and 6(B) show microstructures of the metal of the piping 13, which is SUS304 containing 0.07% carbon, at points P and Q respectively in FIG. 5, obtained after low carbon austenitic stainless steel containing delta ferrite in several percent has been deposited on the inner surface of the piping 13 as shown at 15 in the vicinity of the edge 14. In order to obtain a suitable bead shape and to meet the requirement of increasing welding efficiency, build-up welding is performed on the inner surface of a tubular member generally with a heat input of 8000 to 10000 J/cm. FIGS. 6(A) and 6(B) are photographs of portions of the inner surface of the piping 13 adjacent the deposited metal 15 produced by build-up welding performed with a heat input of 8000 J/cm, and the photographs show sensitization of the metal after ASTM A262E method (Strauss test) have been conducted. Strauss tests are conducted for the perpose of determining the presence of a chromium-depleted-zone and delta ferrite. FIG. 6(A) shows point P in FIG. 5, and FIG. 6(B) shows point Q in FIG. 5. In FIG. 6(B), a portion disposed rightwardly of a boundary M is the deposited metal 15 produced by build-up welding (the deposited metal produced by build-up welding in the piping 13), and a portion disposed leftwardly of the boundary M is a zone affected by the heat of build-up welding for depositing the welded metal 15. It has been observed that delta ferrite is precipitated as shown at 16 in the deposited metal produced by build-up welding in the piping, and that a chromium-depleted-zone 17 is present in the build-up welding heat affected zone. The chromium-depleted-zone 17 is also present in FIG. 6(A).

Figure 3C:
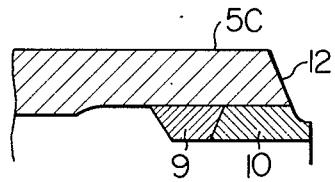

Even if the edge 11 of the tubular member 5C treated as shown in FIG. 3 is welded to the edge 14 of the piping 13 having the deposited metal 15 produced by build-up welding as shown in FIG. 5, the chromium-depleted-zone 17 in the piping 13 will not disappear and will remain in the completed piping. Thus when a corrosive fluid flows through the piping 13 after completion of the repair, there are possibilities that stress corrosion cracking will be occurred along the chromium-depleted-zone.

Figure 7:
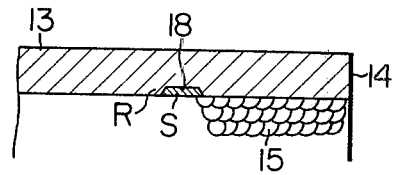
FIG. 7 is a view in explanation of the principles of the present invention applicable to the existing piping of a nuclear power plant.

An attempt has been made to melt, by using a nonfiller TIG welding technique, a zone 18 (the zone sensitized by build-up welding to produce the deposited metal 15) shown in FIG. 7 on the inner surface of the piping 13 (SUS304 containing 0.07% carbon) in a position adjacent the deposited metal 15, and it has been found that delta ferrite is precipitated in the zone 18. It has also been found that a chromium-depleted-zone is reduced in a portion of the inner surface of the piping 13 adjacent the zone 18 which has been affected by the heat of melting.

Figure 8A:
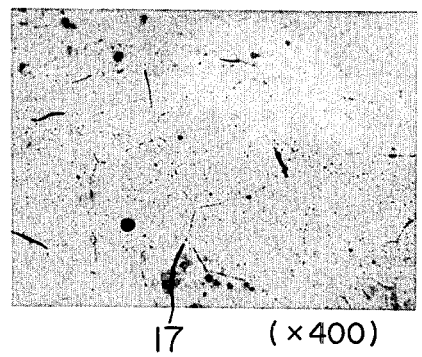
FIG. 8 shows the microstructures of the material of the piping at point R in FIG. 7 after a zone 18 has been melted, FIG. 8(A) showing the microstructure obtained when the heat input for causing melting is 6000 J/cm, FIG. 8(B) showing the microstructure obtained when the heat input is 4000 J/cm and FIG. 8(C) showing the microstructure obtained when the heat input is 3000 J/cm.
Figure 8B:
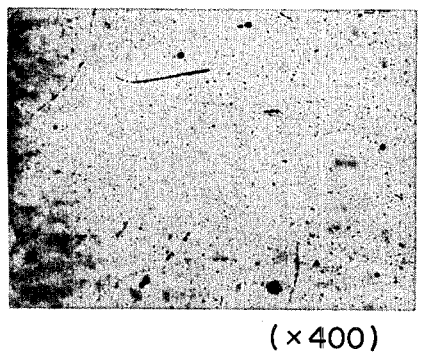
Figure 8C:
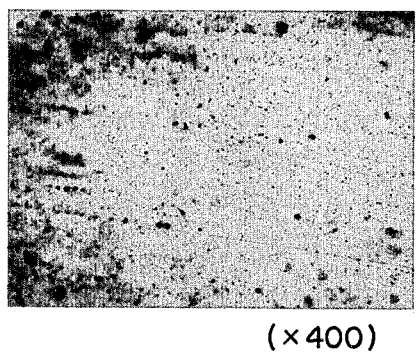

In the attempt described hereinabove, the heat input for melting a portion of the piping 13 to produce the delta ferrite precipitated zone 18 following the production of the deposited metal 15 by build-up welding with a heat input of 8000 J/cm was varied. FIG. 8 shows photographs of point R in FIG. 7 taken after Strauss test have been conducted. FIGS. 8(A), 8(B) and 8(C) show the Strauss microstructures of point R when the heat inputs for producing the delta ferrite precipitated zone 18 by melting were 6000 J/cm, 4000 J/cm and 3000 J/cm respectively. The heat input of 6000 J/cm has produced the chromium-depleted-zone 17 of a limited extent at point R. However, the heat inputs of 4000 and 3000 J/cm have produced no chromium-depleted-zone 17 at point R. That is, when the heat input is below 5000 J/cm, no chromium-deplated-zone 17 is present at all at point R in the vicinity of the delta ferrite precipitated zone 18.

Figure 9:
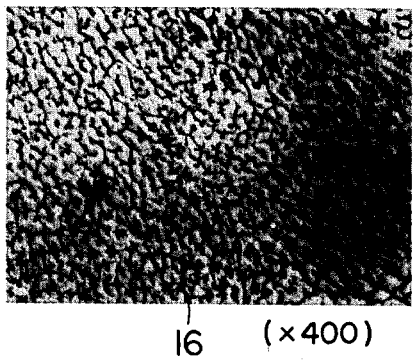
FIG. 9 is a view showing the microstructure of the material of the piping shown at point S in FIG. 7 obtained when the heat input for melting the zone 18 is 6000 J/cm.

FIG. 9 is a photograph of point S in FIG. 7 taken when the heat input for melting a portion of the inner surface of the piping 13 to produce the delta ferrite precipitated zone 18 was 6000 J/cm. The photograph shows the microstructure of point S after Strauss tests have been conducted. It will be seen that delta ferrite 16 is precipitated at point S. The heat inputs of 4000 J/cm and 3000 J/cm for producing the zone 18 by melting have also caused precipitation of delta ferrite 16 at point S.

Thus it has been ascertained that when a portion of the inner surface of the piping 13 adjacent the deposited metal 15 produced by build-up welding is melted following the production of the deposited metal 15, the occurrence of the chromium-depleted-zone 17 on the inner surface of the piping 13 in a portion near the deposited metal 15 is greatly reduced. Therefore, welding of a fresh tubular member to the edge 14 of the piping 13 will reduce the possibilities of the occurrence of stress corrosion cracking in the piping 13. The use of a heat input of 8000 J/cm for melting the inner surface of the piping 13 to produce the delta ferrite precipitated zone 18 has caused the occurrence at point R of the chrominum-depleted-zone 17 of the same extent as that shown in FIG. 6(A). Therefore, when the delta ferrite precipitated zone 18 is produced by melting, it is desired that the heat input used be smaller than that used for producing the deposited metal 15 by build-up welding. If it is desirable to cause the chromium-depleted-zone 17 to disappear completely, a heat input below 5000 J/cm is preferably used for melting the inner surface of the piping 13 to produce the delta ferrite precipitated zone 18. With the disapperance of the chromium-depleted-zone 17, it is possible to prevent the occurrence of stress corrosion cracking in the piping 13.

Figure 10A:
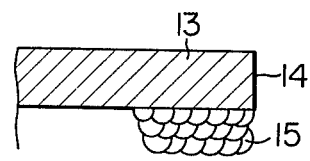
FIG. 10 shows the steps of the method comprising a preferred embodiment of this invention, FIG. 10(A) showing the existing piping of a nuclear power plant having a defective portion removed therefrom and having metal deposited by build-up welding on its inner surface, FIG. 10(B) showing the piping of FIG. 10(A) formed with a melted zone following the build-up welding, FIG. 10(C) showing the piping of FIG. 10(B) having edge preparation done thereon and FIG. 10(D) showing the existing piping processed through the aforesaid steps (A) to (C) and joined to a fresh tubular member treated in the same manner as described with reference to the existing piping.
Figure 10B:
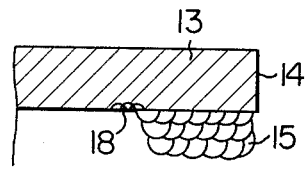

A preferred embodiment of the present invention which has been developed on the basis of the aforesaid studies will now be described by referring to FIG. 10. When the piping 13 (SUS304 containing 0.07% carbon) of a nuclear power plant needs repair, a portion thereof that is defective is cut off, and build-up welding is performed to deposit low carbon austenitic stainless steel (carbon, below 0.03%) on the inner surface of the piping 13 in a position shown at 15 near the edge 14 of the piping at which welding is to be effected, as shown in FIG. 10(A). The deposited metal 15 is produced by build-up welding with a heat input of 8000 J/cm. Following the build-up welding, a portion of the inner surface of piping 13 adjacent the deposited metal 15 produced by build-up welding is melted with a heat input of 4000 J/cm, to produce the melted zone 18 as shown in FIG. 10(B). In melting the inner surface of the piping 13, a portion of the inner surface disposed adjacent the end of the deposited metal 15 remote from the edge 14 of the piping 13 is melted circumferentially through 360 degrees in such a manner that a portion of the deposited metal 15 is simultaneously melted, and then a portion adjacent the melted portion is melted circumferentially through 360 degrees in such a manner that a portion of the previously melted portion is simultaneously melted again. In this way, the portion of the inner surface of the piping 13 extending inwardly from the inner end of the deposited metal 15 is smoothly shaped, so that the concentration of stress in this zone can be reduced.

Figure 10C:
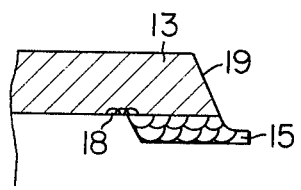
Figure 10D:
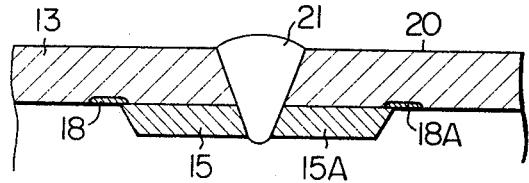

Delta ferrite is precipitated in the zone 18 shown in FIG. 10(B). Then, as shown in FIG. 10(C) edge preperation is done at 19 at the edge 14 of the piping 13 where welding is to be effected. A fresh tubular member 20 to be joined by welding to the piping is subjected, at one end portion thereof, to the same treatment as described by referring to FIGS. 10(A) to 10(C) to deposit low carbon austenitic stainless steel at 15A by build-up welding and to produce a melted zone 18A adjacent the deposited metal 15A on the inner surface of the tubular member 20 by following the steps described hereinabove. The piping 13 and the tubular member 20 are welded to produce a weld 21 at the joint as shown in FIG. 10(D). The other end portion of the tubular member 20 and the other end portion of the piping 13 are also treated in the same manner as described hereinabove by following the steps shown in FIGS. 10(A) to 10(C), and then welded together as shown in FIG. 10(D), thereby completing the repair of the piping 13.

It will be appreciated that the present invention enables the occurrence of stress corrosion cracking to be prevented when welding is performed to repair the existing piping of a nuclear power plant by cutting off a defective portion of the piping and connecting a fresh tubular member to the piping in place of the severed defective portion.

The metal may be deposited on the inner surface of the fresh tubular member 20 by build-up welding in accordance with the process shown in FIG. 3, and then the fresh tubular member 30 thus treated may be welded to the piping 13. Also, a portion of the inner surface of the piping 13 may be melted with a low heat input to produce the delta ferrite precipitated zone 18, and then the deposited metal 15 may be produced by build-up welding on the inner surface of the piping 13 in a position interposed between the zone 18 and the edge 14 of the piping 13, without lessening the effect achieved by the present invention.

It is to be understood that this invention can have application in the work of repairing the existing piping of a plant and can achieve the effect of preventing stress corrosion cracking from being occurred in the piping repaired by welding in not only a nuclear power plant but also any other type of plant.

The present invention offers the advantage of markedly reducing the occurrence of stress corrosion cracking in the existing piping of a plant repaired by welding.

What is claimed is:

1. A method for welding tubular members of stainless steel comprising the steps of:
depositing metal by build-up welding on a portion of the inner surface of each of the tubular members adjacent an edge of the tubular member where welding is to be effected, said portion of the inner surface being exposed to a corrosive fluid when in service;
melting a portion of the inner surface of each of the tubular members in a zone adjacent the metal deposited by build-up welding and affected by the welding heat when the build-up welding is performed, said portion of the inner surface being exposed to the corrosive fluid when in service; and welding the tubular members of stainless steel at the edges thereof after the aforesaid steps have been completed.

2. A method of welding tubular members of stainless steel as set forth in claim 1, wherein melting of the portion of the inner surface of each said tubular member adjacent the metal deposited by build-up welding and exposed to a corrosive fluid when in service is effected with a lower heat input than depositing of the metal by build-up welding.

3. A method for welding tubular members of stainless steel as set forth in claim 2, wherein the heat input used for melting the portion of the inner surface of each said tubular member adjacent the metal deposited by build-up welding and exposed to a corrosive fluid when in service is below 5000 J/cm.

* * * * *